United States Patent [19]

Langlois et al.

[11] Patent Number: 4,594,065

[45] Date of Patent: Jun. 10, 1986

[54] DRIVE CONTROL APPARATUS FOR AN INJECTION-MOLDING MACHINE

[75] Inventors: Jacques A. E. Langlois, Vellmar; Klaus A. Liebetraut, Kassel, both of Fed. Rep. of Germany

[73] Assignee: U.S. Philips Corporation, New York, N.Y.

[21] Appl. No.: 645,879

[22] Filed: Aug. 29, 1984

[30] Foreign Application Priority Data

Sep. 2, 1983 [DE] Fed. Rep. of Germany ....... 3331648

[51] Int. Cl.⁴ .................... B29C 45/64; B29C 45/76
[52] U.S. Cl. .................................. 425/150; 264/40.5; 425/590
[58] Field of Search ............... 425/155, 157, 167, 150, 425/590; 264/40.5, 378.11; 356/375

[56] References Cited

U.S. PATENT DOCUMENTS

| | | | |
|---|---|---|---|
| 3,616,495 | 11/1971 | Lemelson | 425/155 |
| 3,647,309 | 3/1972 | Thompson | 425/150 |
| 3,825,386 | 4/1974 | Bello | 425/150 |
| 3,859,400 | 1/1975 | Ma | 264/40.5 |
| 4,131,596 | 12/1978 | Allen | 425/150 |
| 4,230,442 | 10/1980 | Reese et al. | 425/590 |
| 4,377,377 | 3/1983 | Arends et al. | 425/155 |

FOREIGN PATENT DOCUMENTS 2077957  12/1981  United Kingdom ............... 425/155

Primary Examiner—Jay H. Woo
Assistant Examiner—Timothy W. Heitbrink
Attorney, Agent, or Firm—Robert T. Mayer; Bernard Franzblau

[57] ABSTRACT

A control arrangement for moving tools brings these tools quickly into a desired position smoothly and without shock. The arrangement comprises means for preadjusting the required displacement so that the whole displacement path corresponding to the movement sweep of the tool is first determined. A calculation member (4) converts a given delay of the tool movement into a value corresponding to the speed of movement. An integrator (6) derives from the calculated speed value as a function of time a required position value. Upon movement of the tool the means for preadjusting the required displacement are continuously readjusted and the adjusted value for the drive (25) is determined by means of a comparison with the position value supplied by the actual displacement pick-up device (8).

16 Claims, 1 Drawing Figure

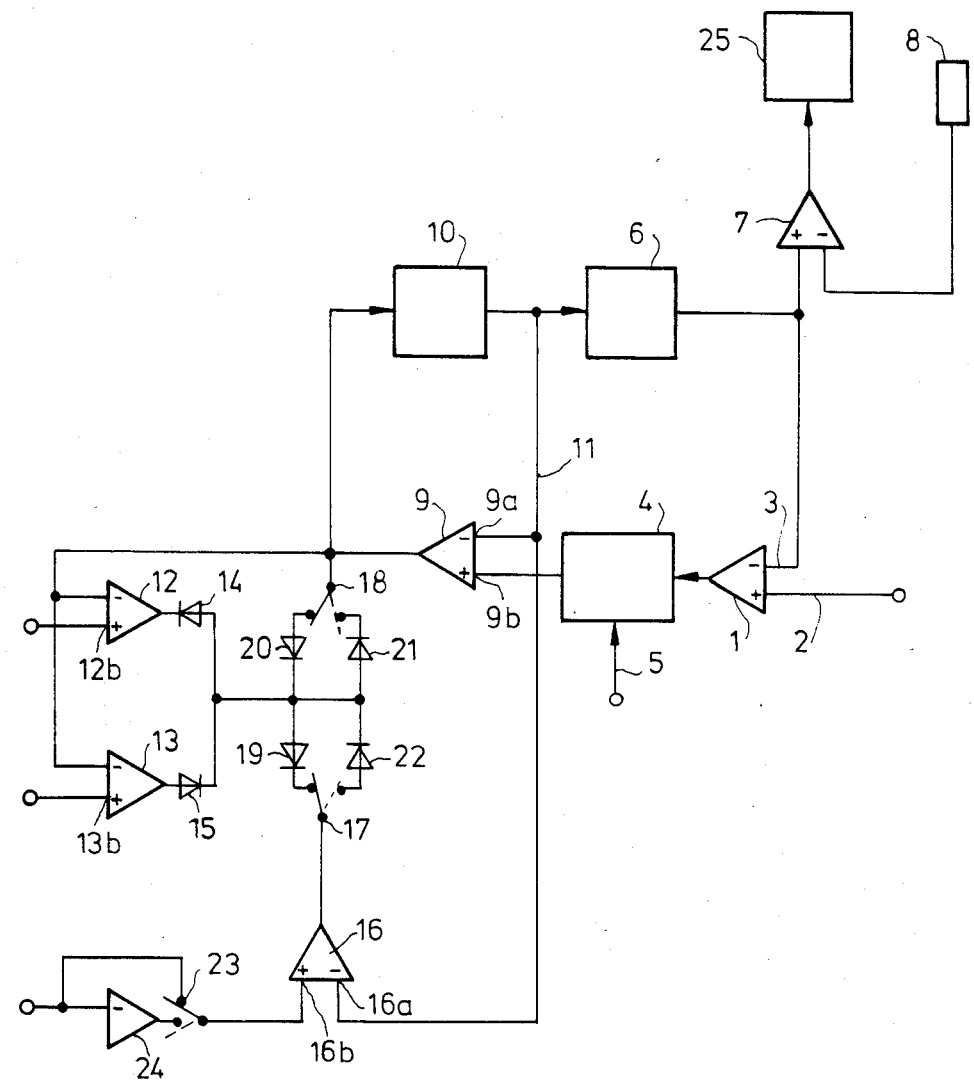

DRIVE CONTROL APPARATUS FOR AN INJECTION-MOLDING MACHINE

This invention relates to a drive arrangement for controlling the movement of tools, notably of mould parts of a machine for injection-moulding of synthetic material with the use of an actual displacement pick-up device, by which the tool movement is determined in a displacement-dependent manner.

DE-OS 2324839 discloses an arrangement for controlling a drive for the movement of tools, notably of mould parts of a machine for injection-moulding of synthetic material, which, when the mould is opened and closed, measures the actual speed of the movable mould parts and renders it equal to an adjustable nominal speed. When the mould is closed, the mould parts move at a constant speed towards each other until a given closing pressure is attained. The resulting collision of the mould parts leads to undesirable vibrations. These vibrations delay the closing process and increase the liability to wear.

An object of the present invention is to provide an arrangement for controlling a drive by which tools, notably mould parts of a machine for injection-moulding of synthetic material, are quickly brought into the desired position, for example a closing position, such that they come to a standstill in the given final position smoothly and without shocks.

According to the invention this object is achieved by a control arrangement comprising, means for preadjusting the required displacement, by which the whole displacement path corresponding to the movement sweep of the tool is first determined, a calculation member for converting a given delay of the tool movement into a value corresponding to the speed of movement, and an integrator which derives from the calculated speed value as a function of time a required position value, by which upon movement on the one hand the means for preadjusting the required displacement are continuously readjusted and on the other hand the regulated value for the drive is determined in comparison with the position value supplied by the actual displacement pick-up device. As a result, there is derived from a given displacement path corresponding to the movement sweep and from an adjustable delay a displacement-dependent speed profile which passes to zero towards the end of the movement sweep.

According to an embodiment of the invention, the calculation member derives the speed of movement from the given delay of the tool movement, from the whole displacement path corresponding to the movement sweep and from the required position. The calculation member then derives at any instant the speed of movement, which the tool is not allowed to exceed, in order that the braking force to be transferred by the drive or by an associated braking device is sufficient to brake the tool until it comes to a standstill in its given final position. Since the delay can be chosen, the control arrangement can be used with differently dimensioned braking devices.

An advantageous embodiment of the invention is characterized by a speed control circuit which is coupled between the calculation member and the integrator and comprises a series arrangement of a control amplifier driven by the calculation member and an integration member. The integration member supplies a nominal speed signal on the one hand via a feedback loop to the control amplifier and on the other hand to the integrator. The speed control circuit ensures that the tool is accelerated smoothly from its stationary position.

A further embodiment of the invention is characterized by a speed limiter which is connected to the feedback loop and limits an acceleration signal supplied by the control amplifier to the integration member to a zero level when the nominal speed reaches a maximum speed predetermined by the speed limiter. In order to prevent complicated mould parts from being damaged when the injection mould is opened, it is advantageous to limit the speed of the movable mould parts.

According to an embodiment of the invention, the speed limiter comprises an operational amplifier which compares the maximum speed with the nominal speed. The speed limiter according to the invention is of simple construction so that it can be manufactured at low cost and can operate in a reliable manner.

An advantageous embodiment of the invention is characterized by at least one element for limiting the acceleration signal to a predetermined level and comprises a differential amplifier having an inverting input connected on the one hand via a feedback diode to the output of the differential amplifier and on the other hand to the input of the integration member. The non-inverting input of the differential amplifier receives a signal corresponding to the predetermined level of the acceleration signal. Due to the limitation of the acceleration, the energy consumption is reduced and the load of the—for example hydraulic—driving aggregate is diminished.

In order that the invention may be readily carried out, it will now be described, by way of example, with reference to the accompanying drawing, in which:

BRIEF DESCRIPTION OF THE DRAWINGS

The sole FIGURE shows diagrammatically an embodiment of an arrangement for controlling a drive for the movement of tools according to the invention.

The means for preadjusting the required displacement is constructed as an operational amplifier 1 which is supplied via the non-inverting input 2 with the displacement path value corresponding to the whole movement sweep of the tool and via the inverting input 3 with the required position value. The means for preadjusting the required displacement control by means of the difference between the movement sweep (Z) and the required position value (W) is the calculation member 4, to which can be supplied via a control input 5 a value corresponding to the delay (B) of the tool movement. The calculation member 4 calculates therefrom the maximum speed of movement (V) which the tool is allowed to reach in order that it can be braked smoothly with a given delay until it comes to a standstill, with reference to the relation.

$$V = \sin(Z - W) | \sqrt{2B|(Z - W)|} |.$$

The calculation member 4 can be followed by an integrator 6 which derives the required position from the speed of movement. The required position value is supplied to the non-inverting input of the comparator 7, which is constructed, for example, as an operational amplifier having an inverting input to which is supplied the position value of the tool determined by an actual displacement pick-up device 8. The difference between the required position and the position value is calculated by the comparator 7 and results in an adjusted value which can be supplied to the adjustment drive 25 of a servo valve for the hydraulic drive of a movable injection-mould part.

The calculation member 4 may also be followed by a control amplifier 9 and an integration member 10. The integration member 10 produces, from an acceleration signal formed by the control amplifier 9, a nominal speed signal which is supplied, on the one hand through a feedback loop 11 to the control amplifier 9, and on the other hand to the integrator 6 for producing the required position value.

The signal supplied via the non-inverting input 2 to the operational amplifier 1 and corresponding to the whole movement sweep has the form of a positive step function.

Since the required position of the tool is initially still zero at the beginning of a tool movement, the difference between the required position value and the movement sweep supplied by the amplifier 1 to the calculation ember 4, and the speed of movement derived by the calculation member 4, also have the form of a step function. Since the nominal speed signal fed back by the integration member 10 through the feedback loop 11 to the inverting input 9a of the control amplifier 9 is initially zero, the acceleration signal derived by the control amplifier 9 from the difference between the nominal speed signal and the speed of movement signal assumes a high value. The integration member 10 produces therefrom the nominal speed value which starting from a zero value, increases steadily. The required position value produced by the integrator 6 then also steadily increases.

The difference between the movement sweep and the required position value, which corresponds to the displacement path still to be covered by the tool, decreases so that the speed of movement derived by the calculation member 4 from this difference also decreases. The nominal speed increases when the speed of movement exceeds the nominal speed and therefore the acceleration signal produced by the control amplifier 9 is positive. Thus, the tool is accelerated. It is not until the speed of movement is lower than the nominal speed that the acceleration signal derived by the control amplifier 9 from the difference between the speed of movement and the nominal speed assumes a negative value and the tool is braked smoothly until it comes to a standstill in the final position. Since the braking operation immediately follows the acceleration process, the tool is moved in a very short time from the starting position to the final position.

If the mould part is to be moved from the final position back to the starting position, a zero potential is applied to the non-inverting input 2 of the operational amplifier 1. The required position has a positive value and is subtracted from this zero potential so that the difference between the movement sweep and the required position value, the speed of movement, the acceleration and the nominal speed have negative values. As a result, the required position value decreases and the tool moves smoothly back to the starting position.

Differential amplifiers 12 and 13 limit the positive and negative acceleration signals, respectively.

The inverting input of the differential amplifier 12 and of the differential amplifier 13 are electrically connected on the one hand to the connection lead between the control amplifier 9 and the integration member 10 and on the other hand each through a feedback diode 14 and 15, respectively, arranged in forward direction and in reverse direction, respectively, to the output of the differential amplifier 12 and 13, respectively. In the case of positive acceleration signals, the feedback diode 14 is conducting, while in the case of negative acceleration signals the feedback diode 15 is conducting. The inputs 12b and 13b, respectively, of the differential amplifiers 12 and 13, respectively, receive the positive and negative values, respectively, by which the positive acceleration signal and the negative acceleration signal, respectively, are limited.

The nominal speed value signal is supplied to the inverting input 16a of a speed limiter constructed as an operational amplifier 16. The output of op-amp 16 is electrically connected through two switches 17 and 18 and four switching diodes 19 to 22 to the connection lead between the control amplifier 9 and the integration member 10.

In the position shown in the Figure of the switch 23 a signal corresponding to the maximum speed of the tool from the starting position to the final position is supplied to the non-inverting input 16b of the operational amplifier 16. In the position shown in broken lines of the switch 23, a signal changed in polarity by the inverter 24 and hence corresponding to the maximum speed in the opposite direction is supplied to this input.

In the direction of movement of the tool from the starting position to the final position, the switches 17, 18 and 23 have the position shown in the Figure. As long as the maximum speed is higher than the nominal speed, the operational amplifier 16 controls the switching diode 19 via the switch 17 with a positive voltage so that the switching diode 19 is cut off and hence the acceleration signal can be limited only by the elements 12 to 15 for limiting the acceleration signal.

When the nominal speed reaches the value of the maximum speed, the output voltage of the operational amplifier 16 becomes zero and the switching diode 19 is switched to the conductive state. Via the switching diode 20 and the switch 18, the input of the integration member 10 is then also coupled to the zero potential so that the nominal speed retains the value attained.

It is not until the signal supplied by the calculation member 4 to the input 9b of the control amplifier 9 falls below the value of the nominal speed signal that the integration member 10 is driven by a negative acceleration signal, while the value of the nominal speed decreases, the output voltage of the operational amplifier 16 again assumes a positive polarity and the switching diode 19 is cut off. The negative polarity of the acceleration signal moreover ensures that the switching diode 20 is also cut off so that the acceleration signal can be limited neither by the elements 12 to 15 for limiting the acceleration signal nor by the speed limiter consisting of the operational amplifier 16.

If the tool is moved from the final position back to the starting position, the signals corresponding to the speed of movement, to the nominal speed and to the acceleration have a negative polarity. Moreover, upon inversion of the movement of the tool, the switches 17, 18 and 23 are switched to the positions shown in broken lines so that the operational amplifier 16 is electrically connected through the diodes 21 and 22 to the connection lead between the control amplifier 9 and the integration member 10.

The output voltage of the operational amplifier 16 is negative and cuts off the switching diode 22 until the value of the negative nominal speed signal reaches the value of the signal corresponding to the maximum speed. The output signal of the operational amplifier 16 then becomes zero and switches the switching diode 22 into the conductive state so that the negative acceleration signal is also limited to a zero value and the nominal speed retains its value.

It is not until the value of the negative output signal of the calculation member 4 falls below the value of the likewise negative nominal speed signal that the integration member 10 is driven by the control amplifier 9 with a positive acceleration signal. The integration member 10 integrates upwards, that is to say that the value of the negative nominal speed signal increases. When the level of the nominal speed signal reaches a value that falls below the level of the negative signal corresponding to the maximum speed, the output signal of the operational amplifier 16 again assumes a negative polarity and the switching diode 22 is cut off. The switching diode 21 is cut off by the positive acceleration signal, which can now be influenced neither by the elements 12 to 15 for limiting the acceleration nor by the speed limiter 16.

What is claimed is:

1. An arrangement for controlling a drive for a movement of a tool with the use of a pick-up device for determining an actual displacement of the tool so that the tool movement is determined in a displacement-dependent manner comprising: means for preadjusting a required displacement value corresponding to a required movement sweep of the tool, a calculation member for converting a given delay of the tool movement into a signal value corresponding to a speed of movement of the tool, and an integrator which derives from a calculated speed signal value a required displacement value as a function of time, by which upon movement of the tool the means for preadjusting the required displacement value is continuously readjusted, and a comparison device for deriving a control value for the drive by a comparison of the required displacement value with the actual displacement determined by the pick-up device.

2. An arrangement as claimed in claim 1, characterized in that the calculation member derives the speed of movement from the given delay of the tool movement, the whole displacement value corresponding to the movement sweep and the required displacement value.

3. An arrangement as claimed in claim 1, for smoothly accelerating the tool, characterized by a speed control circuit coupled between the calculation member and the integrator and which comprises a series arrangement of a control amplifier driven by the calculation member and an integration member which supplies a nominal speed signal via a feedback loop to an input of the control amplifier and to the integrator.

4. An arrangement as claimed in claim 3 further comprising a speed limiter, connected to the feedback loop so as to limit an acceleration signal supplied by the control amplifier to the integration member to a zero level when the nominal speed signal reaches a maximum speed predetermined by the speed limiter.

5. An arrangement as claimed in claim 4 wherein the speed limiter comprises an operational amplifier, which compares a maximum speed signal with the nominal speed signal.

6. An arrangement as claimed in claim 3 wherein the control amplifier supplies an acceleration signal to the integration member, said arrangement further comprising at least one differential amplifier element for limiting the acceleration signal to a predetermined level, said differential amplifier having an inverting input connected through a feedback diode to an output of the differential amplifier and to an input of the integration member, and means for applying to a non-inverting input of the differential amplifier a signal corresponding to the predetermined level of the acceleration signal.

7. An arrangement as claimed in claim 2 for smooth acceleration of the tool and further comprising a speed control circuit that includes a control member and an integration member connected in cascade between an output of the calculation member and an input of the integrator, a nominal speed signal developed at an output of the integration member being supplied to the input of the integrator and via a feedback loop to an input of the control amplifier.

8. An arrangement as claimed in claim 7 further comprising a speed limiter connected to the feedback loop thereby to limit an acceleration signal supplied by the control amplifier to the integration member to a given level when the nominal speed signal reaches a predetermined maximum speed.

9. An arrangement as claimed in claim 8 wherein the speed limiter comprises a comparator having a first input that receives the nominal speed signal and a second input which receives a maximum speed signal.

10. An arrangement as claimed in claim 4 further comprising a differential amplifier for limiting the acceleration signal to a predetermined level, means connecting an inverting input of the differential amplifier to an input of the integration member and via a feedback diode to an output of the differential amplifier, and means connecting a non-inverting input of the differential amplifier to a reference signal corresponding to the predetermined level of the acceleration signal.

11. An apparatus for controlling a drive mechanism for the movement of parts of a machine comprising: a displacement pick-up device for deriving a position value signal indicative of an actual position of a machine part whose movement is to be controlled, an input terminal for a command signal indicative of a desired movement sweep of the machine part, a first comparator having a first input coupled to said input terminal and a second input, a calculation member having a first input coupled to an output of the first comparator and a second input coupled to a terminal which supplies a signal indicative of a given delay of the machine part movement, said calculation member being responsive to signals at the first and second inputs thereof for deriving at an output thereof an output signal having a signal value corresponding to a speed of movement of the machine part, first means for coupling said output of the calculation member at which the output speed value signal appears to an input of an integrator which in turn derives from the speed value signal a signal indicative of the required position value of the machine part, second means for coupling said required position value signal to the second input of the first comparator and to one input of a second comparator, third means for coupling the actual position value signal from the pick-up device to an other input of the second comparator, and means for applying an output signal of the second comparator to a drive device for movement of said machine part.

12. An apparatus as claimed in claim 11 wherein said first coupling means comprises a speed control circuit including a control amplifier and an integration member connected in cascade between the output of the calculation member and the input of the integrator, said integration member supplying a nominal speed signal to the input of the integrator and via a feedback circuit to an input of the control amplifier whereby the speed control circuit provides a smooth acceleration of the machine part.

13. An apparatus as claimed in claim 12 further comprising a speed limiter coupled to the speed control circuit so as to limit an acceleration signal supplied by the control amplifier to the integration member to a zero level when the nominal speed signal reaches a level corresponding to a maximum predetermined speed set by the speed limiter.

14. An apparatus as claimed in claim 13 wherein the speed limiter comprises a third comparator having a first input coupled to a terminal that supplies a reference signal indicative of the maximum predetermined speed of the machine part and a second input coupled to an output of the integration member at which said nominal speed signal appears, said output of the third comparator being coupled to a circuit point between an output of the control amplifier and an input of the integration member.

15. An apparatus as claimed in claim 12 further comprising a network for limiting an acceleration signal value supplied by the control amplifier to the integration member, said network comprising a differential amplifier having a non-inverting input coupled to a terminal that supplies a reference signal that determines the limiting value of the acceleration signal and an inverting input coupled to an input of the integration member and via a feedback diode to an output of the differential amplifier.

16. An apparatus as claimed in claim 11 wherein said machine comprises an injection-molding apparatus and said machine parts comprise the mold parts of the injection-molding apparatus.

* * * * *